Figure 1:
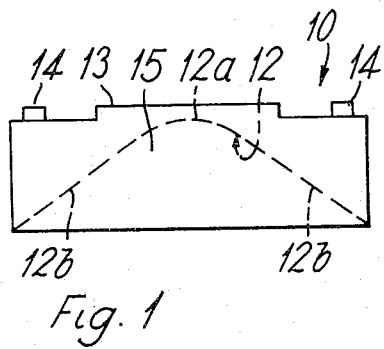

United States Patent [19]

Lennox

[11] 3,896,502
[45] July 29, 1975

[54] ENDOPROSTHETIC BONE JOINT DEVICES

[75] Inventor: William Murdoch Lennox, Cheltenham, England

[73] Assignee: National Research Development Corporation, London, England

[22] Filed: Jan. 7, 1974

[21] Appl. No.: 431,402

[30] Foreign Application Priority Data
Jan. 12, 1973  United Kingdom ............... 1789/73

[52] U.S. Cl. ............................ 3/1.91; 128/92 C
[51] Int. Cl. .............................. A61f 1/24
[58] Field of Search ....................... 3/1,30–35, 3/1.9, 1.91; 128/92 C, 92 CA, 92 R

[56] References Cited
UNITED STATES PATENTS

| | | |
|---|---|---|
| 3,521,302 | 7/1970 | Müller ............................ 3/1 |
| 3,547,115 | 12/1970 | Stevens .......................... 3/1 X |
| 3,728,742 | 4/1973 | Averill et al. .................. 3/1 |
| 3,765,033 | 10/1973 | Goldberg et al. ............... 3/1 |
| 3,774,244 | 11/1973 | Walker ........................... 3/1 |

OTHER PUBLICATIONS
"Metal Alloplasty of the Knee Joint" by E. J. Moeys, Journal of Bone and Joint Surgery, Vol. 36–A, No. 2, April 1954, pages 363–367.

Primary Examiner—Ronald L. Frinks
Attorney, Agent, or Firm—Cushman, Darby & Cushman

[57] ABSTRACT

An endoprosthetic ankle joint device is provided including a tibial component in the form of a trough defining a concave surface and a talar component having a generally complementary convex surface which is received in the trough in mutual bearing engagement for articulation about the trough long axis. The concave and convex surfaces can have a cross-sectional profile which is wholly formed by revolution of said long axis, or partly so in the centre with rectilinear end parts, but in either case the included angle of this profile is larger for the concave surface. Also, these surfaces can be cylindrical with the profile curves of the same radius, or the convex surface can be convexly longitudinally curved to allow additional articulation orthogonal to the first articulation. In any case the trough ends provide stability in the longitudinal direction. The components can be secured to their respective bones with gap-filling cement by providing grooved or equivalent formations remote from the bearing surfaces.

7 Claims, 9 Drawing Figures

ENDOPROSTHETIC BONE JOINT DEVICES

This invention concerns prosthetic devices and, more particularly, articulating endoprosthetic bone joint devices.

While articulating endoprosthetic devices have been proposed for a number of different bone joints, none appears to have been proposed for the ankle joint. Indeed, when the natural articular function of the ankle joint is beyond repair, the currently normal treatment is that of fusion of the joint.

An object of the present invention is to improve this last situation by the provision of an endoprosthetic ankle joint device which affords articulation similar to that of the natural joint.

In a more general aspect the relevant device comprises a tibial component and a talar component; an endoprosthetic ankle joint device comprising; a talar component and a tibial component; said talar component including a body in the form of a trough defining a concave surface having a longitudinal surface portion and two end surface portions, and said longitudinal portion being at least partly a surface of revolution about a longitudinal axis; said tibial component including a body defining a convex surface of generally complementary form to said concave surface, with one at least partly revolutionary longitudinal surface portion and two end surface portions, for receipt of said convex surface in said concave surface to engage said longitudinal surfaces of revolution in mutual articulatory bearing engagement; and said component bodies being adapted remotely from said concave and convex surfaces for respective securement to the talus and tibia.

In one form of the invention the cross-sectional profile of each of said longitudinal surface portions comprises a central part of circular arcuate shape flanked by like edge parts of rectilinear form having tangential relationship with the central portion and defining a generally V-shaped configuration. The central portions of the profiles of the longitudinal surface portions can be of the same radius and are therefore of complementary form, while the edge parts of the tibial component profile define a V-shaping of larger included angle than those of the talar component. It will be appreciated that, in this form of the invention, the components can be engaged and articulated between portions in which a corresponding pair of the profile edge parts, one such part from each component profile, abut to afford a stop action. The angular range of such movement is defined by the excess of the included angle of the tibial profile V-shaping relative to that of the talar component, and this range is chosen to be similar to that of the natural joint, that is to say within a range of 50°–70°.

In another form of the invention said longitudinal surface portions are wholly shaped as surfaces of revolution, which again can be of respectively complementary form, without the aforementioned rectilinear tangential edge parts in cross-sectional profile. In this instance articulation and a stop action therefore can be afforded by making the angular extent of the relevant profile of the talar component greater than that of the tibial component, and providing the former component with flanges extending from the longitudinally-directed extremities of its longitudinal surface portion to engage the respectively corresponding rims of the latter component and thereby limit articulation. This second form of the invention simplifies the component geometry and so may offer advantages in manufacture of the components.

In the two forms of the invention just described the longitudinal surface portions of the components normally will by cylindrical to allow mutual articulation between the relevant components only by rotation about their common longitudinal direction. More particular in this case, the talar component has a longitudinal extent substantially the same as that for the tibial component concave surface with receives the same, so that the adjacent end surface portions of the components engage to inhibit longitudinal movement of the former component within the latter. This simulates the mortise-and-tenon action of the natural joint in which the talus is restrained against lateral movement in a mortise-like structure formed by the internal malleolus of the tibia and the outer malleolus of the fibula.

However, it may be desired to provide some capability for articulation between the components which is orthogonal relative to that just discussed. Such a capability can be provided by making at least the revolutionary longitudinal surface of the talar component additionally convexly curved in the longitudinal direction. In this case the corresponding surface in the tibial component can be unchanged, or made longitudinally concave to a lesser curvature than that of the longitudinal convexity in the talar component, so that the latter component can roll within the former. In either of these events, the end surface portions of the tibial component will be outwardly inclined relative to those of the talar component.

Regarding securement of the components of the proposed device: this will normally involve removal of bone from the tibia and talus to receive the surfaces of the respective components remote from their concave and convex surfaces, and associated use of acrylic cement or equivalent gap-filling medium. For this purpose the revelant remote surfaces are preferably formed with relatively low relief grooves, ribs, studs or equivalent formations to provide an enchanced key with said cement, and also to ensure an adequate extent and depth of cement adjacent the relevant surfaces.

Figure 2:
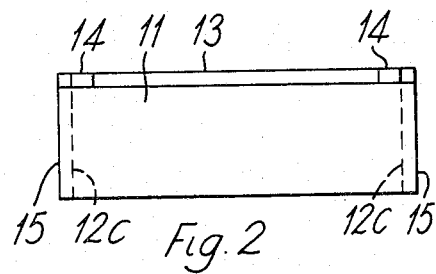
Figure 3:
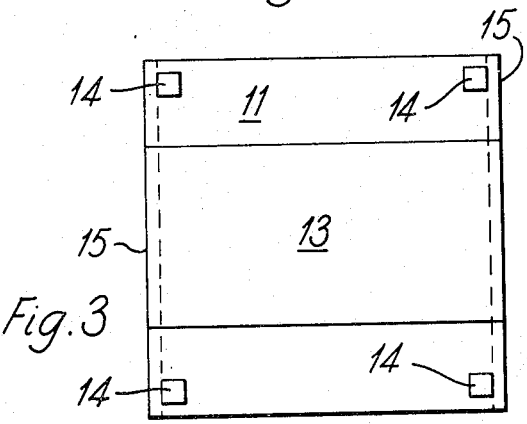
Figure 4:
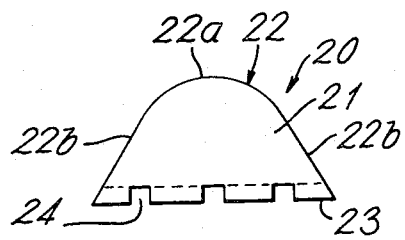
Figure 5:
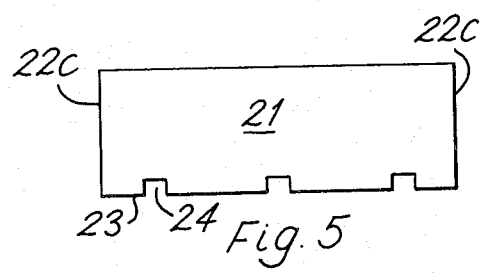
Figure 6:
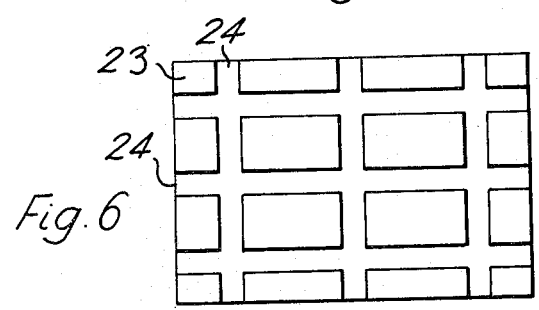
Figure 7:
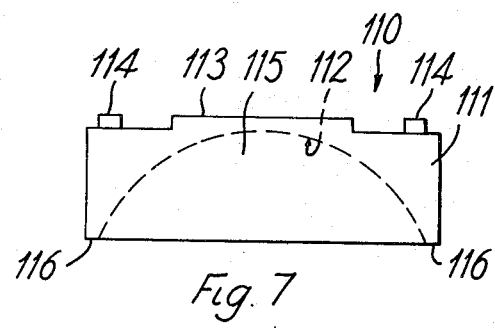
Figure 8:
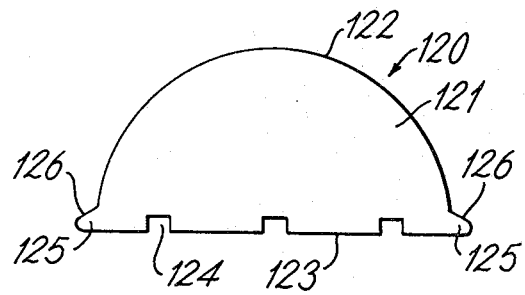
Figure 9:
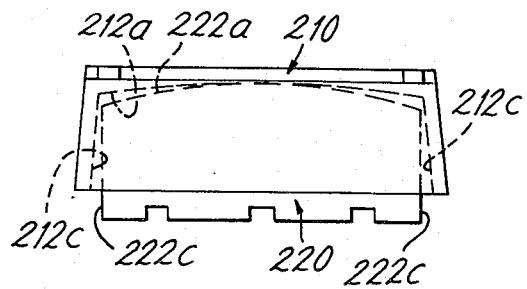

In order to further clarify the invention as so far described above, some embodiments thereof will now be described by way of example with reference to the accompanying drawings, in which:

FIGS. 1, 2 and 3 respectively illustrate the tibial component of one embodiment in end elevation, said elevation, and underneath plan views, FIGS. 4, 5 and 6 similarly illustrate the associated talar component, FIGS. 7 and 8 respectively illustrate the tibial and talar components of another embodiment in end elevation, and FIG. 9 illustrates in side elevation a modification for the embodiments of FIGS. 1–8.

The tibial component illustrated by FIGS. 1–3 is denoted generally at 10 and can be regarded as comprising a rectangular block main body 11 having one of its major faces relieved to provide a concave cylindrical surface 12 extending longitudinally therealong. The cross-sectional profile of the longitudinal portion of this surface 12 has a central part 12a of circular arcuate shaping flanked by like rectilinear edge parts 12b tangential thereto. The longitudinal portion of the surface 12 is accordingly symmetrical and is symmetrically disposed relative to a longitudinal medial plane of the body 11. Indeed, it will be seen that the tibial component as a whole is symmetrical in this way.

The other major face of the block 11 is also effectively relieved to provide a relatively low relief structure comprising a platform 13 extending longitudinally wholly therealong, and laterally over a central portion of the relevant face. This low relief structure also comprises four studs 14 of like height as the platform 13 and respectively spaced from the corners of the platform adjacent the corners of the relevant face.

Lastly regarding this tibial component, the main body 11 is provided with end walls 15 which, together with the surface 12, serve to form the component to a generally trough-like socket structure. These end walls define end surface portions 12c for the cylindrical surface 12, which portions are planar and orthogonal to the longitudinal direction of the surface 12.

The associated talar component illustrated by FIGS. 4–6 is denoted generally at 20 and comprises a cylindrical block 21 having two major longitudinal surfaces 22 and 23 of which one, 22, is convexly rounded and the other, 23, is substantially planar. The rounded major face 22 is of similar cylindrical form to the aforementioned tibial component surface 12 in that the former also has a cross-sectional profile comprising a central part 22a of circular arcuate shaping flanked by like rectilinear end parts 22b which define an included angle therebetween which is less than that of the corresponding portions 12b of the surface 12. The face 22 is further similar to surface 12 in being longitudinally bounded by end surfaces 22c which are planar and orthogonal to the longitudinal direction.

The planar face 23 is, similarly to the corresponding 'remote' surface of the tibial component, formed with a relatively low relief structure which in this case involves the provision of a plurality of longitudinally and laterally directed grooves 24.

Lastly regarding this talar component: it is to be noted that this component is symmetrical about a longitudinal medial plane; its surface 23 is of substantially the same longitudinal length as, but not greater than that of the tibial component surface 12; and the surface 23 is of greater extent than the surface in the directions of their respective longitudinal medial planes of symmetry.

Turning to the second illustrated embodiment, this is of the second form referred to in the earlier introductory passage whereas the first illustrated embodiment is of the first such form. In practice these two embodiments can be essentially the same except for the cross-sectional profile shaping of their respective longitudinal surfaces. It is for this reason that the second embodiment is only illustrated by end elevations, and it is convenient to use the same reference numerals in FIGS. 7 and 8 for items which correspond to those in FIGS. 1 and 6, but with the addition of a 'one hundred digit' for purposes of distinction.

In any event, it will be seen that the tibial component 110 of FIG. 7 has a longitudinal surface portion 112 shaped as a right circular cylindrical segment. However this surface portion does not extend completely to the longitudinal outer side surfaces of the component body 111, but is set laterally just within the body to provide longitudinally directed strip surface portions 116 extending therefrom.

Similarly, the talar component 120 has a right circular cylindrical segmentally shaped longitudinal surface portion 122 of like radius as the tibial component bearing surface 112, but extending over a greater arcuate range in cross-sectional profile. This surface 122 is also associated with longitudinally directed strip surfaces 126 laterally therefrom as provided by flanges 125.

The modification of FIG. 9 is applicable to either of the two embodiments just described and, for convenience, employs the same reference numerals again for corresponding features but with the addition of a 'two hundred digit.' In any event, FIG. 9 shows the provision of respective convex and concave curvature for the longitudinal surface portions 212a and 222a, and outward inclination of the end surface portions 212c, to afford a capability for mutual articulation orthogonal to that around the longitudinal direction and within the limits determined by abutment of the adjacent end surface portions 212c and 222c.

Regarding the question of materials for the illustrated embodiments: these should naturally be of biologically innocuous form having suitable mechanical properties, and at present it is preferred that the tibial components be of metal, such as an appropriate chromium-cobalt alloy, and the talar components be of plastics material, such as a suitable high density polyethylene. It will be seen that this particular preference is advantageous in each embodiment in employing the plastics material, with its greater susceptibility to wear compared with metal, for the component which is thicker in the region of maximum load bearing, while benefiting from the low frictional characteristics of such a combination of materials.

Use of the illustrated embodiments involves respective location of their surfaces having low relief formations in suitably sectioned and excavated sites in the tibia and talus, and with the longitudinal directions extending in the medio-lateral direction of the joint. Some removal of bone may also be appropriate from the internal face of the outer malleolus of the fibula. The components are secured in these sites in association with cement as discussed earlier, the resultant component dispositions affording mutual bearing engagement between the respective rounded longitudinal surface portions, and a capability for articulation therebetween by mutual sliding of these surface portions about an axis parallel to the longitudinal directions of the components. This articulation simulates that of the ankle joint in the saggital plane, and has an angular range determined by the two positions in which a respective pair of the surface portions 12b and 22b, 116 and 126, abut. If the embodiment is of modified form to allow, in addition, an orthogonal articulation this occurs by a mutual rolling action. Also, it is to be understood that the components can be dimensioned to allow securement within, and without affecting the function of the major elements of, the capsule of the natural joint so that articulation of the prosthesis is effected and controlled by natural muscle and ligament action.

While the invention has been described with more particular reference to the illustrated embodiments it is not intended to be limited thereby. One point of possible variation rests in the cross-sectional geometry of the components. In the illustrated embodiments the components allow equal ranges of articular movement relative to an engaged configuration with the respective planes of symmetry of the components coincident. However, in practice this configuration does not correspond to that of the tibia and talus when standing upright since flexion of different extents are normally possible in respectively opposite senses from this configuration in the natural joint. Thus, the relevant configuration of the natural joint denotes 90° flexion, from which dorsiflexion is normally possible to a position of about 70°, and planar flexion to a position in the range 120°–140°, giving the aforementioned range of 50°–70°. This situation can be simulated by securement of the illustrated components in appropriate relatively rotated positions to correspond to 50° flexion; by providing the components with a suitably larger range of saggital articulation than that required and relying on natural factors to constrain this range; or by the provision of components of which at least one is modified to non-symmetrical form, such as by rotation of the longitudinal surface portions relative to the remaining surface or surfaces of the component.

Another point of possible variation lies in the more particular low-relief formations, and a further such variation is possible in respect of choice and application of materials.

I claim:

1. An endoprosthetic ankle joint device comprising:
   a tibial component in the form of a trough defining a concave inner surface having a substantially part-cylindrical longitudinal surface portion with curved cross-sectional profile, and two end surface portions respectively longitudinally closing said longitudinal surface portion, and defining a rear outer surface which is located remotely from said longitudinal surface portion and is provided with a low relief configuration; and
   a talar component of roller form defining a convex surface having a substantially part-cylindrical longitudinal surface portion and longitudinally opposed end surface portions, said convex surface being substantially complementary to and in mutually articulatory bearing engagement with said concave surface, and defining a rear surface which is located remotely from said convex surface and is provided with a low relief configuration.

2. A device according to claim 1 wherein the longitudinal surface portion of said talar component is convexly longitudinally curved, but to a markedly lesser degree than its cross-sectional profile, to provide a barrel shape for said convex surface.

3. A device according to claim 2 wherein the longitudinal surface portion of said tibial component is concavely longitudinally curved, but to a markedly lesser degree than its cross-sectional profile, and to a lesser degree than the convex longitudinal curvature of said convex surface.

4. A device according to claim 2 wherein each of said end surface portions is substantially planar, and those of said tibial component are outwardly inclined relative to those of said talar component.

5. An endoprosthetic ankle joint device comprising:
   a tibial component including a body in the form of a trough defining a concave surface having a longitudinal surface portion and two end surface portions, said longitudinal portion being partly a surface of revolution about an axis extending in the longitudinal direction of said trough, and said longitudinal portion having a generally V-shaped cross-sectional profile including a central circular arcuate part defined by said surface of revolution and two rectilinear edge parts respectively extending tangentially from said control part; and
   a talar component including a body defining a convex surface of generally complementary form to and in mutually articulatory engagement with said concave surface, with a partly revolutionary longitudinal surface portion, and two end surface portions, the talar longitudinal surface portion have a corresponding V-shaped cross-sectional profile having a lesser V-shaping including angle than said concave surface cross-sectional profile of said tibial component.

6. An endoprosthetic ankle joint device comprising:
   a tibial component including a body in the form of a trough defining a concave surface having a longitudinal surface portion and two end surface portions, said longitudinal surface portion being substantially wholly shaped as a surface of revolution about an axis extending in the longitudinal direction of said trough, and defining two strip surface portions bordering respective opposed longitudinal edges of said longitudinal surface portions in mutually inclined transverse relationship therewith; and
   a talar component including a body defining a convex surface of generally complementary form to and in mutually articulatory engagement with said concave surface, with a substantially wholly revolutionary longitudinal surface portion, and two end surface portions, and defining two flanges respectively extending from the longitudinal edges of said convex longitudinal surface portion to limit said articulatory engagement by abutment with said strip surface portions.

7. The use of an endoprosthetic bone joint device comprising:
   a first component in the form of a trough defining a concave inner surface having a substantially part-cylindrical longitudinal surface portion with curved cross-sectional profile, and defining an outer surface having a rear surface portion located remotely from said longitudinal surface portion and provided with a relieved configuration; and
   a second component of roller form defining a convex surface having a substantially part-cylindrical longitudinal surface portion, which convex surface is generally complementary to said concave surface for engagement therein in mutually articulatory relation, and defining a rear surface located remotely from said convex surface and provided with a relieved configuration; said use comprising:
   replacing the articular function of the ankle joint by exposing said joint,
   resecting the upper and lower bones of said joint,
   respectively connecting said first and second components to said upper and lower bones by way of said rear surfaces while locating said longitudinal surface portions substantially perpendicular to the sagittal plane of said joint, and
   closing said joint to engage said components in said articulatory relation.

* * * * *